(12) United States Patent
Watari et al.

(10) Patent No.: US 11,979,058 B2
(45) Date of Patent: May 7, 2024

(54) HOUSING, ROTATING ELECTRICAL MACHINE USING THE SAME, AND METHOD OF MANUFACTURING HOUSING OF ROTATING ELECTRICAL MACHINE

(71) Applicant: HITACHI AUTOMOTIVE SYSTEMS, LTD., Hitachinaka (JP)

(72) Inventors: Shinjirou Watari, Hitachinaka (JP); Shinji Yamazaki, Hitachinaka (JP); Tomohiro Fukuda, Hitachinaka (JP); Mohdbasir Zulaika, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 354 days.

(21) Appl. No.: 16/496,198

(22) PCT Filed: Jan. 25, 2018

(86) PCT No.: PCT/JP2018/002309
§ 371 (c)(1),
(2) Date: Sep. 20, 2019

(87) PCT Pub. No.: WO2018/179759
PCT Pub. Date: Oct. 4, 2018

(65) Prior Publication Data
US 2020/0169127 A1 May 28, 2020

(30) Foreign Application Priority Data
Mar. 31, 2017 (JP) .................................. 2017-069577

(51) Int. Cl.
*H02K 1/18* (2006.01)
*H02K 5/00* (2006.01)
(Continued)

(52) U.S. Cl.
CPC ............... *H02K 1/185* (2013.01); *H02K 5/00* (2013.01); *H02K 15/028* (2013.01); *H02K 15/14* (2013.01)

(58) Field of Classification Search
CPC .. H02K 5/04; H02K 5/15; H02K 5/22; H02K 15/14; H05K 5/04
See application file for complete search history.

(56) References Cited

U.S. PATENT DOCUMENTS

| 8,541,917 B2* | 9/2013 | Sakuma ................. | H02K 15/16 29/596 |
| 2013/0020902 A1* | 1/2013 | Sato ....................... | H02K 1/185 310/216.118 |

(Continued)

FOREIGN PATENT DOCUMENTS

| JP | H6-60565 A | 3/1994 |
| JP | 11191941 A * | 7/1999 |

(Continued)

OTHER PUBLICATIONS

Office Action issued in Chinese Patent Application No. 201880010655.3 dated Nov. 3, 2020, with machine translation (11 pages).

(Continued)

Primary Examiner — Livius R. Cazan
(74) Attorney, Agent, or Firm — Foley & Lardner LLP (57) ABSTRACT

An object is to assemble a housing to a mating bracket with high accuracy and to improve the reliability of a rotating electrical machine. A housing of a rotating electrical machine according to the present invention is a housing of a rotating electrical machine that accommodates a stator of the rotating electrical machine and is supported by a support member, the housing including: a first tab that forms a first through-hole through which a first screw passes; and a second tab that forms a second through-hole through which a second screw passes and forms a fitting portion that fits (Continued)

with a position adjustment member, wherein the first tab is formed such that a first facing surface facing the support member of the first tab is farther from the support member than a second facing surface facing the support member of the second tab.

2 Claims, 15 Drawing Sheets

(51) Int. Cl.
*H02K 15/02* (2006.01)
*H02K 15/14* (2006.01)

(56) References Cited

U.S. PATENT DOCUMENTS

| | | | | |
|---|---|---|---|---|
| 2014/0062240 | A1* | 3/2014 | Batzner | H02K 5/225 310/91 |
| 2014/0197705 | A1 | 7/2014 | Sato | |
| 2015/0008774 | A1* | 1/2015 | Yamanaka | F01L 1/352 310/71 |
| 2015/0042192 | A1* | 2/2015 | Kanbe | B21D 22/20 310/89 |
| 2016/0118853 | A1* | 4/2016 | Nishikawa | H02K 3/522 310/43 |

FOREIGN PATENT DOCUMENTS

| | | |
|---|---|---|
| JP | H11-191941 A | 7/1999 |
| JP | 2013-55723 A | 3/2013 |
| JP | 2014-138487 A | 7/2014 |
| JP | 2014-181416 A | 9/2014 |

OTHER PUBLICATIONS

International Search Report with English translation and Written Opinion issued in corresponding application No. PCT/JP2018/002309 dated Apr. 24, 2018.

* cited by examiner

HOUSING, ROTATING ELECTRICAL MACHINE USING THE SAME, AND METHOD OF MANUFACTURING HOUSING OF ROTATING ELECTRICAL MACHINE

TECHNICAL FIELD

The present invention relates to a housing, a rotating electrical machine using the housing, and a method of manufacturing the housing of the rotating electrical machine.

BACKGROUND ART

Higher output is required for a motor for an automobile, a generator, or a drive motor, and, for higher output, size of a rotating electrical machine is also increased. In this manner, it is becoming important to improve the reliability in a case where a rotating electrical machine is fixed to a support member.

For example, when a stator core is fixed to a fitted housing, a first tab, on which only a hole of a bolt is formed, and a second tab, on which both a bolt hole and a knock hole for dowel pin are formed, are provided (PTL 1).

However, the technique described in PTL 1, in which tightening and fixing with a bolt are performed after positioning with a dowel pin is performed, does not describe a problem regarding lowering in attaching accuracy and positioning accuracy due to variations at the time the first tab and the second tab are formed.

CITATION LIST

Patent Literature

PTL 1: JP 2014-138487 A

SUMMARY OF INVENTION

Technical Problem

An object of the present invention is to assemble a housing to a mating bracket with high accuracy and to improve the reliability of a rotating electrical machine.

Solution to Problem

A housing of a rotating electrical machine according to the present invention is a housing of a rotating electrical machine that accommodates a stator of the rotating electrical machine and is supported by a support member, the housing including: a first tab that forms a first through-hole through which a first screw passes; and a second tab that forms a second through-hole through which a second screw passes and forms a fitting portion that fits with a position adjustment member, wherein the first tab is formed such that a first facing surface facing the support member of the first tab is farther from the support member than a second facing surface facing the support member of the second tab.

Advantageous Effects of Invention

According to the present invention, a housing can be assembled to a mating bracket with high accuracy, and the reliability of a rotating electrical machine can be improved.

DESCRIPTION OF EMBODIMENTS

Hereinafter, an embodiment of the present invention will be described with reference to the drawings.

Figure 1:
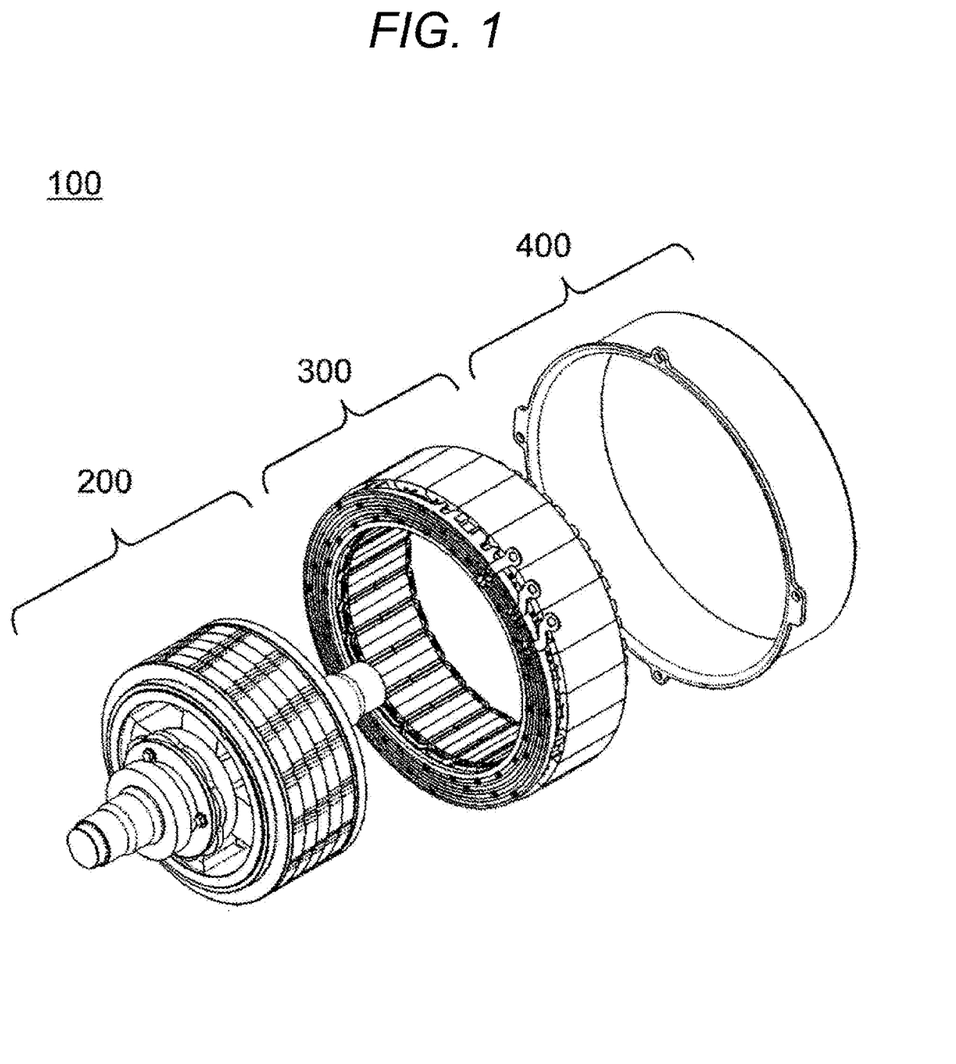
FIG. 1 is an exploded perspective view of a rotating electrical machine 100 according to the present embodiment.

FIG. 1 is an exploded perspective view of a rotating electrical machine 100 according to the present embodiment.

The rotating electrical machine 100 is configured with a rotor 200, a stator 300, and a housing 400. In particular, higher output is required for a motor for an automobile, a generator, or a drive motor, and, for higher output, size of a rotating electrical machine is also increased.

The rotor 200 is configured with a plurality of rotor cores and a permanent magnet. A plurality of the rotor cores are aligned in a rotation axis direction and skewed with each other.

The stator 300 is formed of a divided core, and is configured with a coil wound around the core. The outer periphery of stator 300 is fixed to the inner periphery of the housing 400 by shrink fitting.

The housing 400 has a large plate thickness in order to withstand the vibration caused by a vehicle along with an increase in size of the rotating electrical machine 100.

On the other hand, the housing 400 is manufactured by drawing to improve the productivity. However, with the increase in a plate thickness, the manufacture by drawing is becoming difficult.

Figure 2:
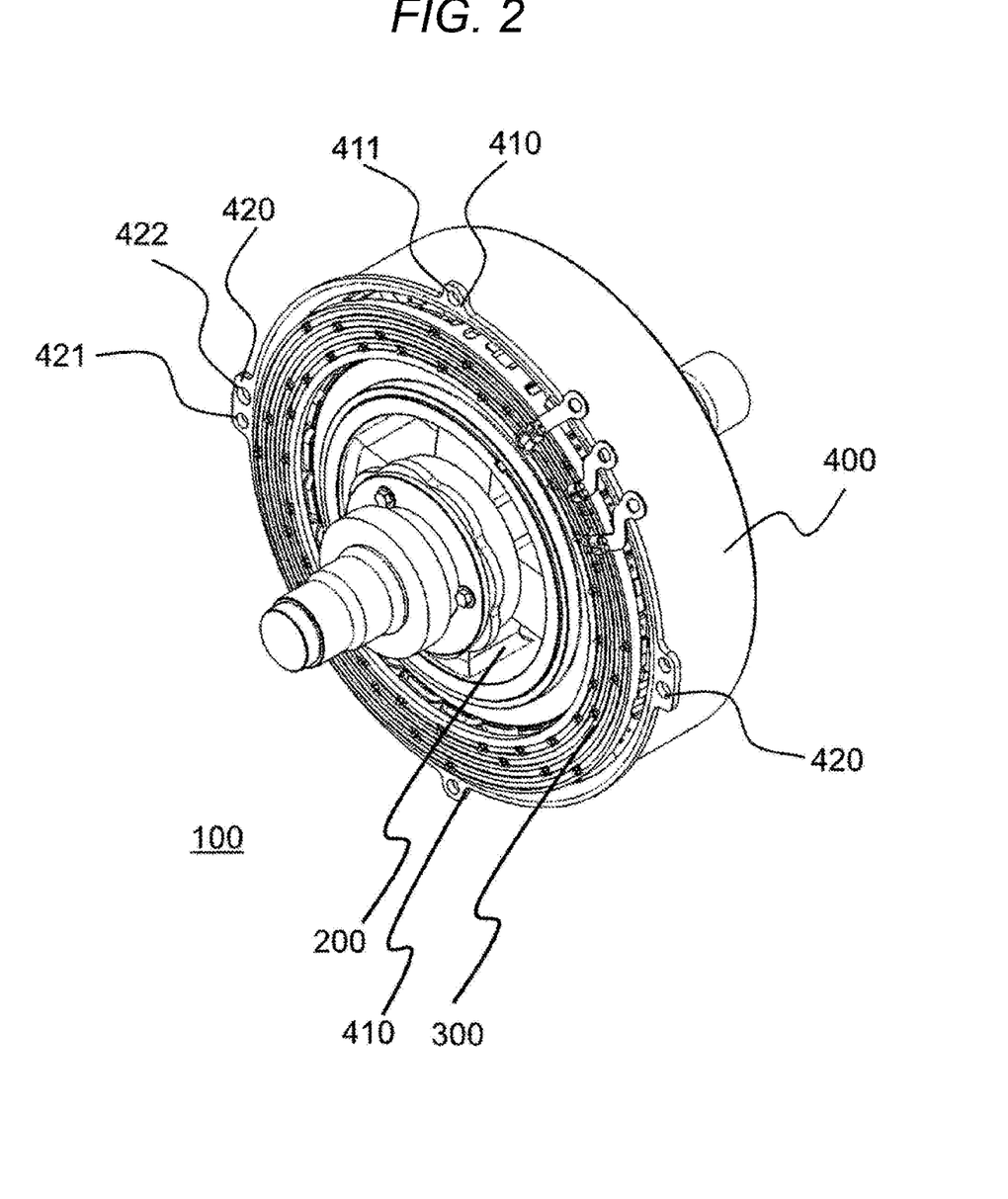
FIG. 2 is an external perspective view of the rotating electrical machine 100 according to the present embodiment.

FIG. 2 is an external perspective view of the rotating electrical machine 100 according to the present embodiment.

The housing 400 includes two first tabs 410 facing each other across the rotor 200 and two second tabs 420 facing each other across the rotor 200. Each of the two first tabs 410 forms a first through-hole 411 through which a first screw 601 described later passes. Each of the two second tabs 420 forms a second through-hole 421 through which the second screw 602 passes, and a fitting portion 422 that fits with a position adjustment member 701.

Figure 3:
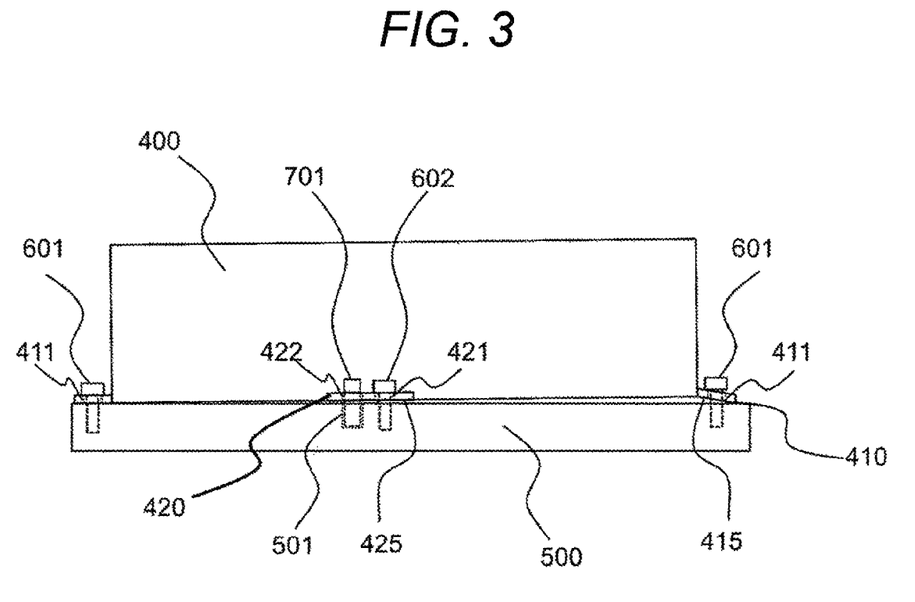
FIG. 3 is a schematic side view showing a state in which a housing 400 according to a comparative example is fixed to a support member 500.

FIG. 3 is a schematic side view showing a state in which the housing 400 according to a comparative example is fixed to a support member 500.

The housing 400 is supported on the support member 500 by the first screw 601 and the second screw 602. Positioning of the housing 400 and the support member 500 is performed by the position adjustment member 701. The support member 500 forms a fitting portion 501 that fits with the position adjustment member 701. The position adjustment member 701 is also referred to as a dowel pin.

The first tab 410 has a first facing surface 415 facing the support member 500, and the second tab 420 has a second facing surface 425 facing the support member 500. The first tab 410 of the housing 400 according to the comparative example is formed such that the first facing surface 415 is closer to the support member 500 than an edge of the housing 400 or the second facing surface 425.

In this case, the first facing surface 415 of the first tab 410 comes into contact with the support member 500, and the housing 400 becomes in an inclined state. Then, the second facing surface 425 is in an inclined state with respect to the support member 500. In such a state, between the housing 400 and the support member 500, the fitting portion 422 of the second tab 420 and the fitting portion 501 of the support member 500 are positioned by the position adjustment member 701.

There has been a problem that, when the second facing surface 425 is inclined with respect to the support member 500, the fitting portion 422 is inclined with respect to the support member 500, and the position adjustment member 701 cannot be fitted to the fitting portion 422, which makes positioning difficult. Alternatively, a hole diameter of the fitting portion 422 of the second tab 420 can be increased to enable fitting even when the second tab 420 is inclined, so that the position adjustment member 701 can be fitted. However, in this case, another problem that the positioning accuracy is deteriorated occurs.

FIGS. 4(a) to 4(f) show a method of manufacturing the housing 400 according to the comparative example.

When manufacturing the housing 400, in order to improve productivity, the housing 400 is manufactured from a roll material obtained by rolling through a drawing process in the order from FIG. 4(a) to FIG. 4(f).

Figure 4:
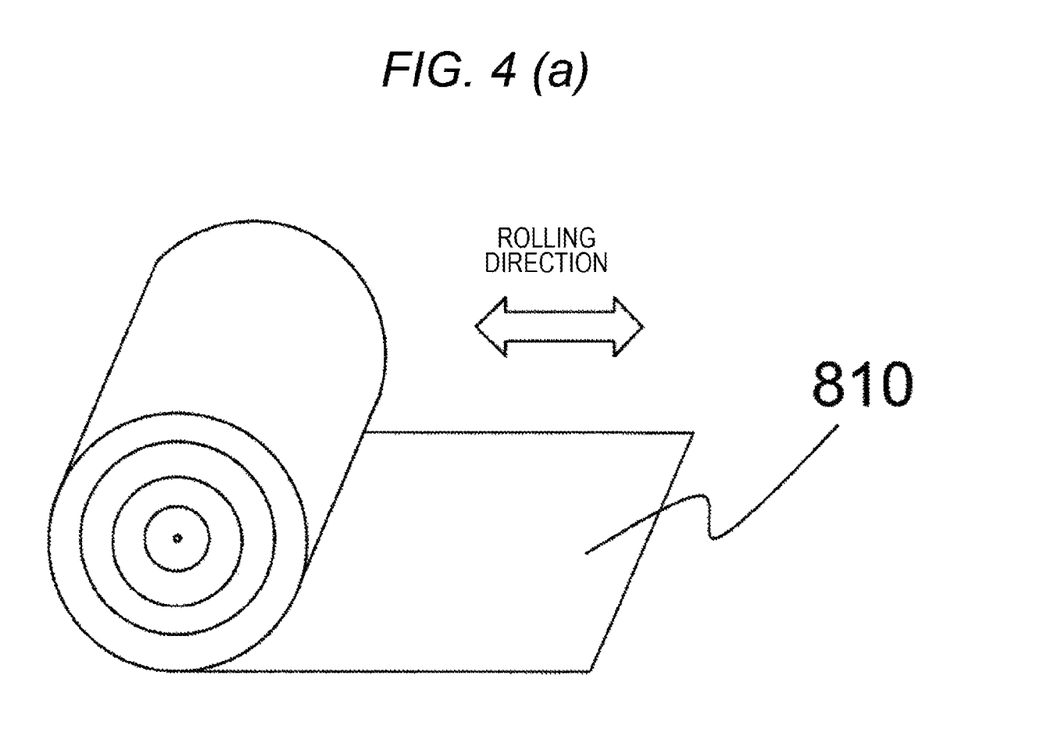
FIG. 4(a) is a perspective view showing a first step of a method of manufacturing the housing 400 according to the comparative example.
FIG. 4(b) is a side view showing a second step of the method of manufacturing the housing 400 according to the comparative example.
FIG. 4(c) is a bottom view and a cross-sectional view showing a third step of the method of manufacturing the housing 400 according to the comparative example.
FIG. 4(d) is a bottom view and a cross-sectional view showing a fourth step of the method of manufacturing the housing 400 according to the comparative example.
FIG. 4(e) is a bottom view and a cross-sectional view showing a fifth step of the method of manufacturing the housing 400 according to the comparative example.
FIG. 4(f) is a bottom view and a cross-sectional view showing a sixth step of the method of manufacturing the housing 400 according to the comparative example.

As shown in FIG. 4(a), a roll material 810 passes is finished to a predetermined size by allowing a plate-like material to pass between a plurality of rotating rolls.

As shown in FIG. 4(b), the blank material 820 is punched by pressing the roll material 810 into a predetermined shape.

As shown in FIGS. 4(c) and 4(d), a drawing material 830 is processed into a pot shape by drawing the blank material 820. A trimming material 840 has a substantially cylindrical shape after a bottom portion 831 and an outer peripheral portion 832 of the drawing material 830 are trimmed.

As shown in FIGS. 4(d) and 4(e), a tab planarizing process material 850 is formed by pressing a tab intermediate material 841 by a first jig 851 and a second jig 852 and planarized.

As shown in FIG. 4(f), a housing final shape 860 is completed by performing the planarizing process through the tab planarizing process.

It is known that the rolled material shown in FIGS. 4(a) to 4(f) has different properties in a rolling direction and in a direction (for example, 45° direction, 90° direction) at an angle to the rolling direction. This anisotropic phenomenon also affects an amount of springback after bending.

For this reason, in the tab planarizing process material 850 shown in FIG. 4(e), springback appears in various manners as shown in the housing final shape 860, even if all the tabs are pressed under the same conditions, and a distance between the first facing surface 415 and the support member 500 and a distance between the second facing surface 425 and the support member 500 are different. It is difficult to make these distances the same, and the manufacturing variation as shown in FIG. 3 may occur.

In view of the above, a method of manufacturing the housing according to the present embodiment will be described hereinafter.

Figure 5:
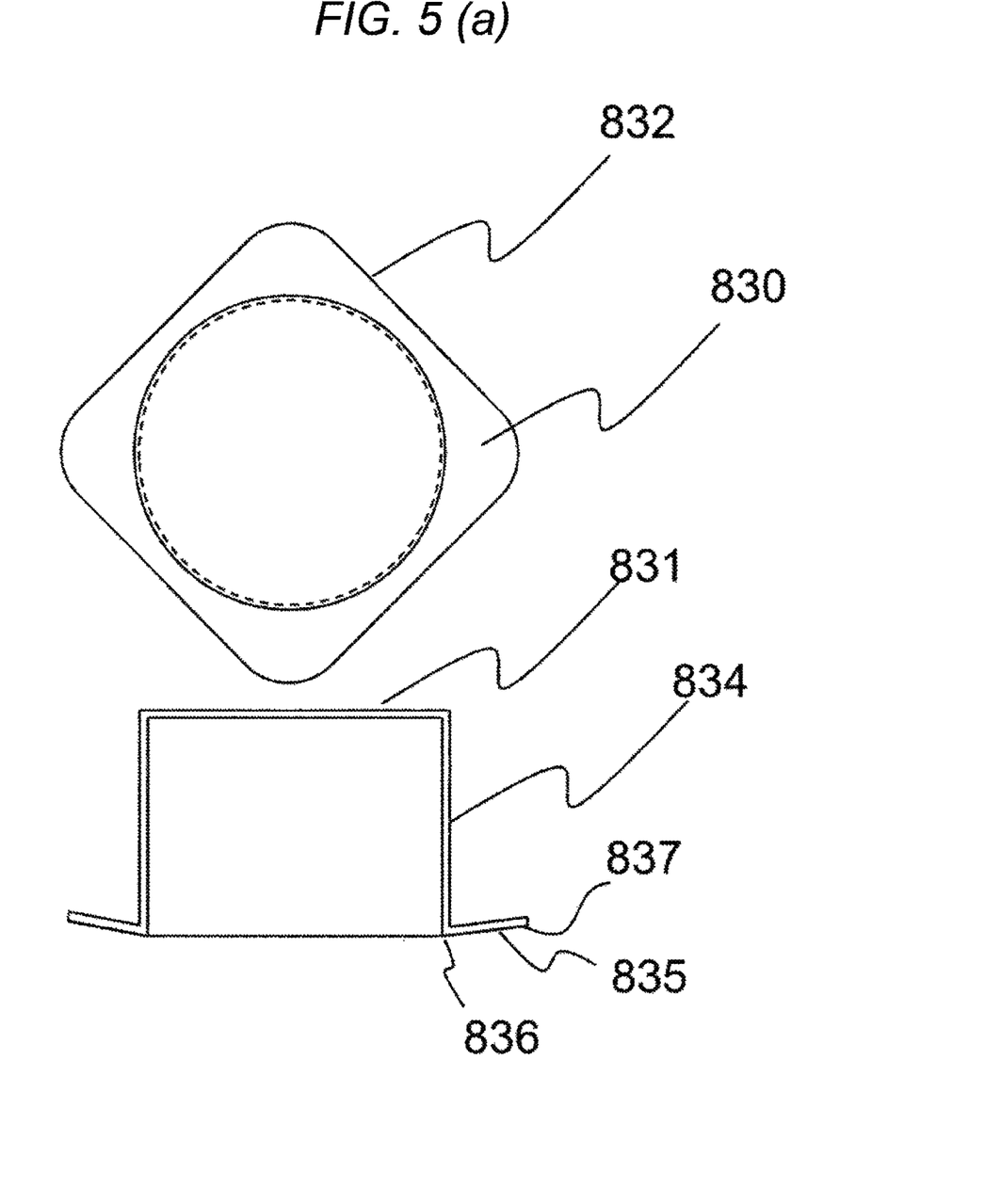
FIG. 5(a) is a bottom view and a cross-sectional view showing a third step of the method of manufacturing the housing 400 according to the present embodiment.
FIG. 5(b) is a bottom view and a cross-sectional view showing a fourth step of the method of manufacturing the housing 400 according to the present embodiment.
FIG. 5(c) is a bottom view and a cross-sectional view showing a fifth step of the method of manufacturing the housing 400 according to the present embodiment.
FIG. 5(d) is a bottom view and a cross-sectional view showing a sixth step of the method of manufacturing the housing 400 according to the present embodiment.

The steps shown in FIGS. 4(a) and 4(b) are the same as the steps of the comparative example. FIG. 5(a) is a bottom view and a cross-sectional view showing a third step of the method of manufacturing the housing 400 according to the present embodiment. FIG. 5(b) is a bottom view and a cross-sectional view showing a fourth step of the method of manufacturing the housing 400 according to the present embodiment.

The drawing material 830 is processed into a cylindrical shape by drawing the blank material 820. At this time, the drawing material 830 is formed, so that a distance from the support member 500 becomes larger from a connecting portion 836 connecting a main body 834 and a flange portion 835 corresponding to the first tab 410 and the second tab 420 formed later along a direction toward a tip 837 of the main body.

As shown in FIG. 5(c), the tab planarizing process material 850 is formed by pressing the tab intermediate material 841 by the first jig 851 and the second jig 852 and planarized. However, at this time, only the second tab 420 is planarized.

As shown in FIG. 5(d), the housing final shape 860 is completed by performing the planarizing process through the tab planarizing process. The first tab 410 is formed so that a distance from the support member 400 becomes larger along a direction from the connection portion 441 to a tip 452 of a main body 430 because the first tab 410 is not planarized. In this manner, the first facing surface 415 can be formed farther from the support member 500 than the second facing surface 425.

Figure 6:
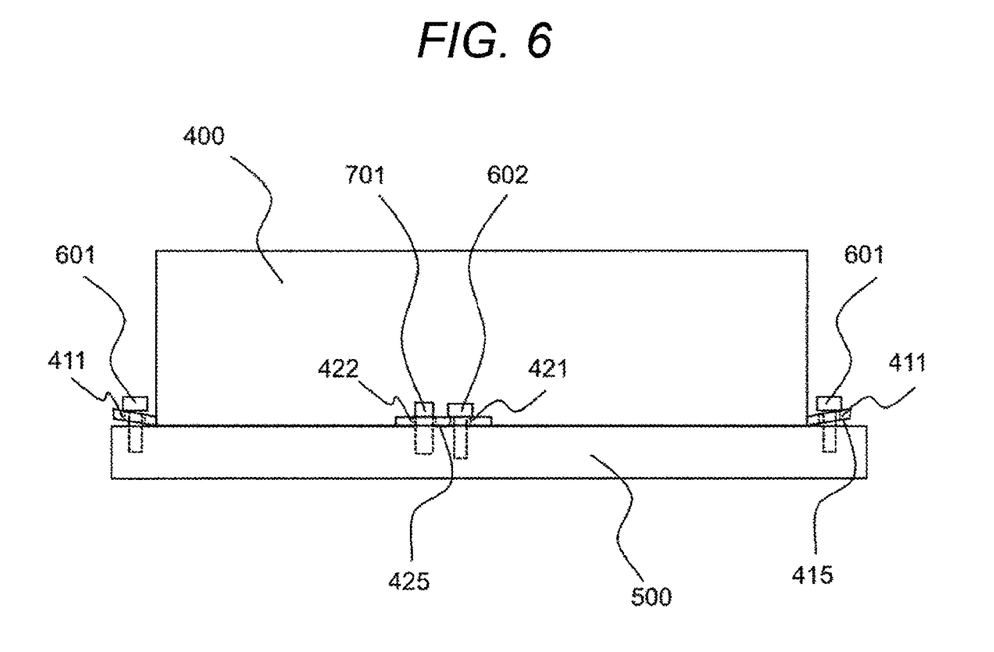
FIG. 6 is a schematic side view showing a state in which the housing 400 by the manufacturing method according to the present embodiment is fixed to the support member 500.

FIG. 6 is a schematic side view showing a state in which the housing 400 by the manufacturing method according to the present embodiment is fixed to the support member 500.

The first facing surface 415 of the first tab 410 facing the support member 500 is formed farther from the support member 500 than the second facing surface 425 facing the support member 500 of the second tab 420. In this manner, the second facing surface 425 can be made substantially parallel to the support member 500, and the position adjustment member 701 and the fitting portion 422 can be fitted without the need of increasing the hole diameter of the fitting portion 422, and positioning accuracy can be improved.

Further, after the housing 400 is positioned on the support member 500, the first tab 410 can be bent and assembled by tightening the first screw 601, and the reliability against the vibration of a vehicle can be improved.

Figure 7:
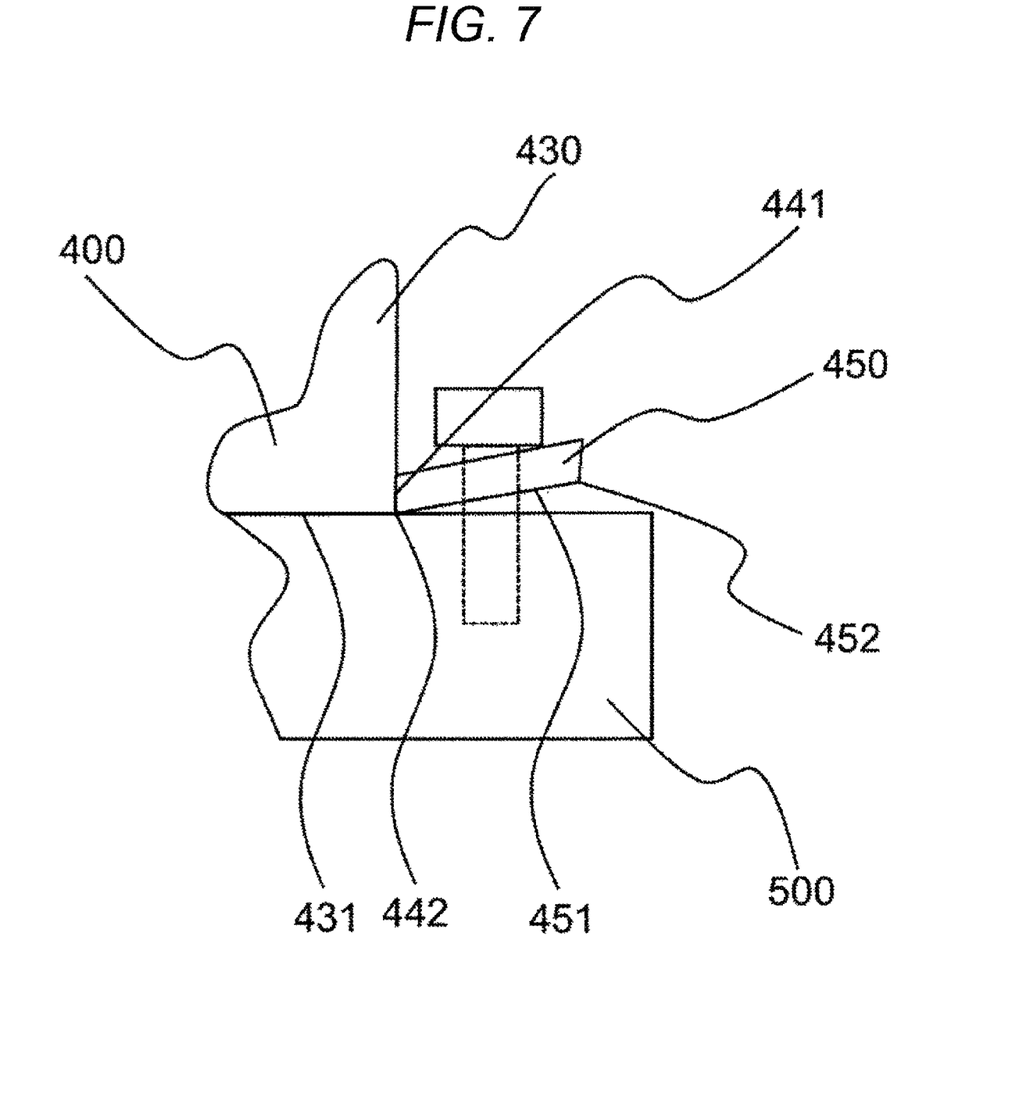
FIG. 7 is an enlarged view around a first tab 410 shown in FIG. 6.

FIG. 7 is an enlarged view around the first tab 410 shown in FIG. 6.

Around the first tab 410 of the housing 400 is configured with the connection portion 441 connecting the main body 430 forming storage space of the housing 400 and the first tab 410, and a first tab main body 450 forming the first through-hole 411.

The first tab main body 450 forms a surface 451 that has a flush surface 442 with an edge 431 of the main body 430 of the housing 400. The first tab main body 450 is formed such that a distance from the support member 500 increases along a direction from the connection portion 441 to the tip 452 of the first tab main body 450.

REFERENCE SIGNS LIST

100 rotating electrical machine
200 rotor
300 stator
400 housing
410 first tab
411 first through-hole
415 first facing surface
420 second tab
421 second through-hole
422 fitting portion
425 second facing surface
430 main body
431 edge
441 connection portion
442 flush surface
451 surface
452 tip
500 support member
501 fitting portion
601 first screw
602 second screw
701 position adjustment member
810 roll material
820 blank material
830 drawing material
831 bottom portion
832 outer peripheral portion
834 main body
835 flange portion
836 connection portion
837 tip
840 trimming material
841 tab intermediate material
850 tab planarizing process material
851 first jig
852 second jig
860 housing final shape

The invention claimed is:

1. A method of manufacturing a housing structure including a housing of a rotating electrical machine arranged to receive a stator of the rotating electrical machine, and a support member supporting the housing, the method comprising:

forming a main body that forms storage space of the housing and a flange portion connected to the main body in a manner that the flange portion is bent to the main body from a connection portion between the main body and the flange portion toward a tip of the flange portion;

forming, from the flange portion, (i) a first tab having a single hole, the single hole including a first through-hole, and (ii) a second tab having two holes, the two holes including a second through-hole and a fitting hole; and processing the first tab and the second tab so that only the second tab, out of the first tab and the second tab, is parallel to a connection surface between the main body and the support member to connect the housing to the support member, and such that a first facing surface of the first tab contacts a support surface of the support member at a first surface portion of the support surface, a second facing surface of the second tab contacts the support surface at a second surface portion of the support surface, the first facing surface is not parallel to the first surface portion, the second facing surface is parallel to the second surface portion, and the first surface portion is parallel to the second surface portion, and causing a first screw to pass through the first through-hole, causing a second screw to pass through the second through-hole, and fitting a dowel into the fitting hole, wherein the first tab and the second tab extend along a periphery of the support member, the second tab having a width along the periphery which is greater than a width along the periphery of the first tab, wherein, prior to any of the screws being applied to the through-holes, the first tab is bent upwardly relative to a plane containing an axial end of the housing, wherein the second tab is parallel to the plane containing the axial end of the housing, and wherein the first tab is one of a plurality of first tabs, each first tab having a single through-hole and a screw passing through the single through-hole, wherein the second tab is one of a plurality of second tabs, each second tab having a fitting hole and a through-hole, a screw passing through the through-hole, wherein the number of first tabs is greater than the number of second tabs.

2. The method according to claim 1, wherein p1 the connection portion has a surface that is flush with an edge of the main body forming storage space of the housing.

* * * * *